(12) United States Patent
Kakarala (10) Patent No.: US 9,324,159 B2
(45) Date of Patent: Apr. 26, 2016

(54) METHOD AND SYSTEM FOR TRACKING MOTION OF A DEVICE

(75) Inventor: Ramakrishna Kakarala, Singapore (SG)

(73) Assignee: Nanyang Technological University, Singapore (SG)

(*) Notice: Subject to any disclaimer, the term of this patent is extended or adjusted under 35 U.S.C. 154(b) by 45 days.

(21) Appl. No.: 14/234,832

(22) PCT Filed: Jul. 16, 2012

(86) PCT No.: PCT/SG2012/000251
§ 371 (c)(1),
(2), (4) Date: Jan. 24, 2014

(87) PCT Pub. No.: WO2013/015742
PCT Pub. Date: Jan. 31, 2013

(65) Prior Publication Data
US 2014/0161320 A1    Jun. 12, 2014

Related U.S. Application Data

(60) Provisional application No. 61/511,667, filed on Jul. 26, 2011.

(51) Int. Cl.
*G06T 7/20* (2006.01)
*G06F 3/03* (2006.01)
*G06F 3/0354* (2013.01)

(52) U.S. Cl.
CPC ............. *G06T 7/204* (2013.01); *G06F 3/0304* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 2002/0179819 A1* | 12/2002 | Nahum | 250/208.1 |
| 2003/0193529 A1* | 10/2003 | Lee et al. | 345/856 |
| 2005/0162393 A1* | 7/2005 | Ahn | 345/166 |
| 2006/0023970 A1* | 2/2006 | Wang | 382/312 |
| 2006/0139458 A1* | 6/2006 | Chou | 348/208.1 |
| 2006/0209015 A1* | 9/2006 | Feldmeier et al. | 345/156 |
| 2007/0108978 A1 | 5/2007 | MacFarlane et al. | |
| 2011/0150271 A1 | 6/2011 | Lee et al. | |

FOREIGN PATENT DOCUMENTS

EP    0 767 443 A2    4/1997

OTHER PUBLICATIONS

A. Rahimi et al., "Reducing Drift in Parametric Motion Tracking", Proceedings of the Eighth IEEE International Conference on Computer Vision, pp. 1-8, 2001.

* cited by examiner

*Primary Examiner* — Jon Chang
(74) *Attorney, Agent, or Firm* — Blank Rome LLP (57) ABSTRACT

The present invention relates to a method for tracking the motion of a device across a surface. The method repeats the following steps: (a) acquiring, using the device, an input image showing an input area of the surface; (b) comparing the input image to a plurality of current reference images to estimate the displacement between the input image and each current reference image; (c) deciding whether to update each current reference image based on the displacements estimated in step (b), and if said decision is positive, updating the current reference image to form an updated reference image; and (d) determining, based on the displacements, the motion of the device across the surface from an area shown in a previously acquired image to the input area. The previously acquired image may be a previously acquired input image or one of the current reference images.

19 Claims, 6 Drawing Sheets

Fig. 1

Prior art

Image at time (t) = 0ms    Image at time (t) = 0.67ms

Fig. 2

Prior art

Fig. 3

Prior art

METHOD AND SYSTEM FOR TRACKING MOTION OF A DEVICE

FIELD OF THE INVENTION

The present invention relates to a method and system for tracking motion of a device across a surface using, in particular, images acquired by the device.

BACKGROUND OF THE INVENTION

Tracking motion of a device across a surface based on images acquired by the device is useful in several applications.

Figure 1:
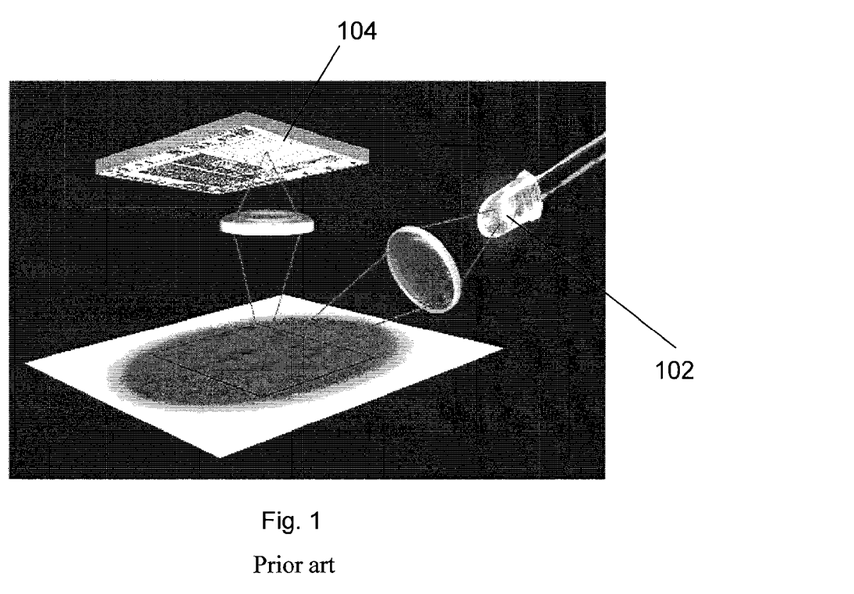
FIG. 1 shows the components of a typical optical mouse.
Figure 2:
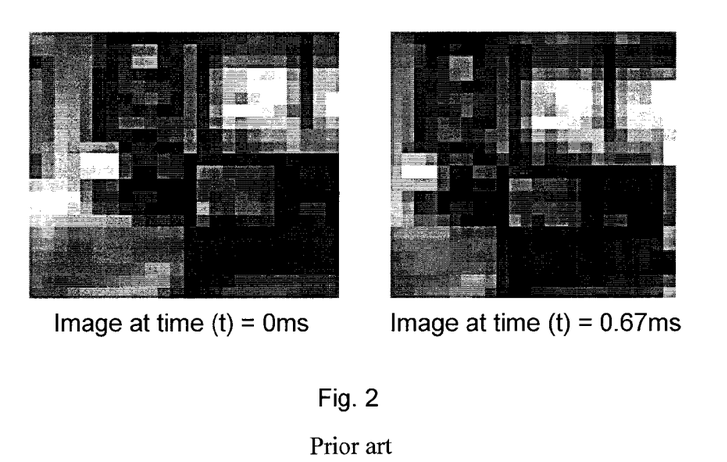
FIG. 2 shows two example images successively acquired by a typical optical mouse as the mouse moves across a surface.

For example, a typical optical mouse today operates by acquiring a series of images as the mouse is moved across a surface (e.g. a desktop). The motion of the optical mouse is tracked using these acquired images. In particular, the optical mouse employs an optical navigation system comprising an image acquisition device which works essentially like a small camera operating at a high frame rate ranging from 1; 500 frames per seconds (fps) to 10,000 fps, with a resolution ranging from 16×16 pixels to 30×30 pixels. FIG. 1 illustrates the components of a typical optical mouse. As shown in FIG. 1, the image acquisition device of the optical mouse comprises a LED 102 (which may alternatively be a Laser) and an image sensor 104 having a pixel array. The LED 102 serves to illuminate the area at which the optical mouse is, so as to allow the image sensor 104 to acquire an image of the area. When the mouse is moved to other areas of the surface, further images of these other areas are acquired in the same manner. FIG. 2 shows two example images acquired successively by an optical mouse as the mouse moves across a surface. From these images, it is possible to determine the displacement of the optical mouse from the area shown in one of the images to the area shown in the other image. Therefore, by acquiring a series of images as the optical mouse is moved to different areas across a surface, the motion of the mouse across the surface can be tracked.

To date, several algorithms for tracking motion of a device from images acquired by the device have been developed. Examples of these are the algorithms developed by Avago, Hewlett-Packard and Microsoft. These prior art algorithms operate by repeatedly estimating the displacement between two images using a single fixed reference image.

Note that in this document, the displacement between two images G and H is a vector and refers to the displacement between the areas g and h respectively shown in the images G and H. The displacement between the areas g and h in turn refers to either the displacement of the area g from the area h, or the displacement of the area h from the area g. Specifically, the notation DGH is used in this document to denote the displacement of the area h shown in the image H from the area g shown in the image G.

The following describes in more detail how the prior art algorithms estimate the displacement between two images.

Figure 3:
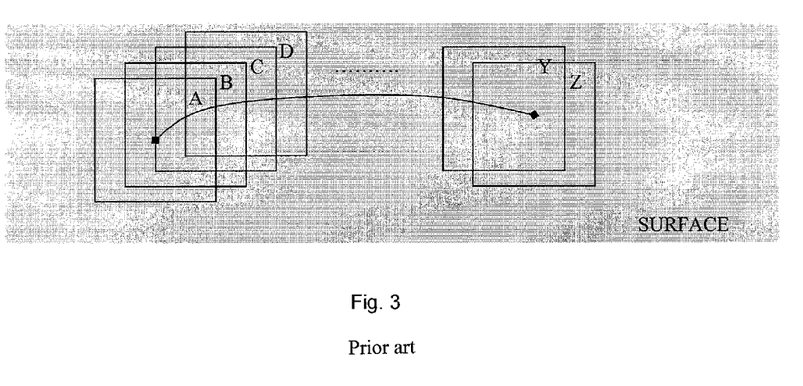
FIG. 3 shows a series of images acquired by a device as the device moves across a surface.

FIG. 3 shows a series of images (i.e. frames A-Z) acquired by a device as the device moves in a planar motion across a surface. The frames A-Z are acquired successively with frame A being the first acquired frame and frame Z being the last acquired frame. In the prior art algorithms, the displacement between two images is determined by comparing the positions of these images to the position of a single fixed reference image.

For example, to determine the displacement DCD, frame A may be used as the single fixed reference image. In this case, the displacements DAC and DAD are first computed. Then, the displacement DCD is determined by the following Equation (1).

$$DCD = DAD - DAC$$

The reason why the prior art algorithms determine the displacement between two images in the above-mentioned way, rather than directly from the positions of the two images, is that sometimes, the two images may not be sufficiently different. More specifically, the shift between the areas shown in the two images may sometimes be so small that it is hard to determine whether there is any shift at all. This usually happens when the movement of the device between acquiring the two images is too small.

There are drawbacks in the above-mentioned approach adopted by the prior art algorithms. For instance, in the above example, if frame A turns out to be an unsuitable reference image because it has a low signal-to-noise ratio, or if the overlap between frames A and D turns out to be insufficiently large to obtain a reliable measure of displacement, then errors are likely to occur in the computation of displacement DAC and/or displacement DAD. This in turn leads to errors in the computation of displacement DCD.

Nevertheless, prior art algorithms to date usually do not aim to achieve high accuracy and low cumulative errors anyway because these are not essential in the current applications utilizing these prior art algorithms. For instance, slight errors in tracking the motion of an optical mouse are usually not noticeable. However, if a more accurate way for tracking the motion of a device from images acquired by the device is available, such motion tracking can be used in many more applications, for example, in print-head displacement measurement, hand-held scanning and device odometry.

SUMMARY OF THE INVENTION

The present invention aims to provide a new and useful method and system for tracking the motion of a device across a surface using images acquired by the device.

In general terms, the present invention proposes using the device to repeatedly acquire input images showing the part of the surface where the device is (the "input area"), and comparing each input image to multiple reference images to determine the motion of the device to the input area shown in the input image.

Specifically, a first aspect of the present invention is a method for tracking the motion of a device across a surface, the method comprising repeatedly performing the following steps (a)-(c):

(a) acquiring, using an image sensor of the device, an input image showing an input area, the input area being a portion of the surface which is in the field of view of the image sensor;

(b) comparing the input image to a plurality of current reference images showing respective current reference areas of the surface to estimate the displacement between the input area and each current reference area, wherein the plurality of current reference images comprise previously acquired images; and (c) determining, based on the displacements, the motion of the device across the surface from an area shown in a previously acquired image to the input area.

The invention may alternatively be expressed as a computer system for performing such a method. This computer system may be integrated with a device, such as an image acquisition device for acquiring images. The image acquisition device may be part of an optical navigation system. The invention may also be expressed as a computer program product, such as one recorded on a tangible computer medium, containing program instructions operable by a computer system to perform the steps of the method.

BRIEF DESCRIPTION OF THE FIGURES

Embodiments of the invention will now be illustrated for the sake of example only with reference to the following drawings, in which:

FIGS. 7(a)-(c) show commercial applications the embodiments of the present invention can be used for.

DETAILED DESCRIPTION OF THE EMBODIMENTS

Method 400

Figure 4:
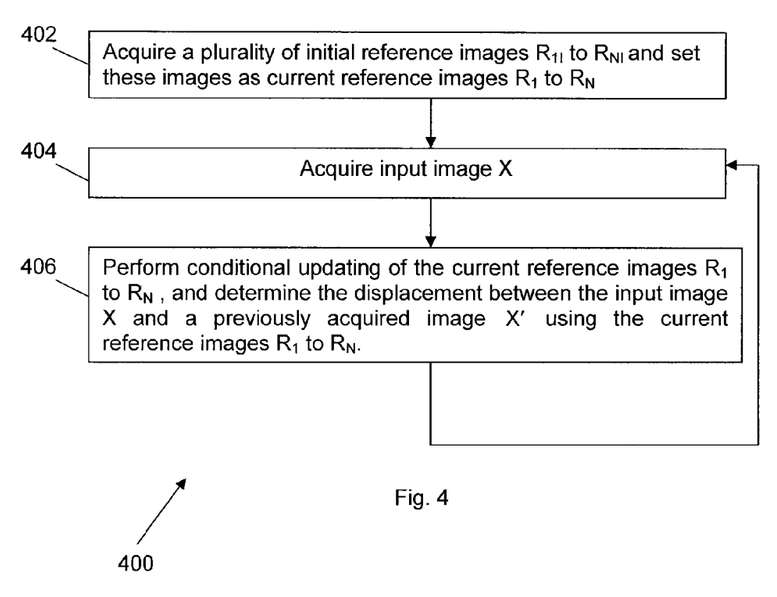
FIG. 4 shows a flow diagram of a method for tracking motion of a device across a surface according to an embodiment of the present invention.

Referring to FIG. 4, the steps are illustrated of a method 400 which is an embodiment of the present invention and which tracks the motion of a device (such as the one illustrated in FIG. 1) across a surface based on images acquired by the device.

Method 400 comprises steps 402, 404 and 406. In step 402, a plurality of initial reference images $R_{1I}$ to $R_{NI}$ are acquired and are set as current reference images $R_1$ to $R_N$. In step 404, an input image X is acquired. In step 406, the displacement between the input image X and a previously acquired image X' is determined using the current reference images $R_1$ to $R_N$. Further in step 406, a conditional updating of the current reference images $R_1$ to $R_N$ is performed (i.e. depending on whether certain conditions are met, one or more of the current reference images $R_1$ to $R_N$ may be updated). As shown in FIG. 4, steps 404 and 406 are repeatedly performed. Note that in each execution of step 406, the previously acquired image X' may be one of the current reference images $R_1$ to $R_N$ or a previously acquired input image.

Each image acquired in method 400 is a two-dimensional (2D) image which comprises a plurality of pixels having respective intensity values at respective coordinates of the image. Furthermore, all the images acquired in method 400 are of the same size (i.e. they have the same pixel dimensions). In this document, the size of the images acquired in method 400 is denoted by the symbol F which represents the width of the images measured in terms of the number of pixels in each of the images. For example, if the image is square, F may be the number of pixels at each side of the square. If they are not square, F may be the width or the height, and preferably the larger of the width and height.

Each input image in step 404 is acquired using an image sensor of the device and shows an area (the "input area") of the surface where the device is (i.e. an area which is in the field of view of the image sensor). When the device is of the form which touches the surface, the device may contact some or all of the input area of the surface, but the device may also cover or contact a part of the surface which is not included in the input area (e.g. a part of the surface which is close to a housing of the device, and which is not in the field of view of the image sensor of the device). Therefore, by repeatedly acquiring input images, and determining the displacements between the input images and previously acquired images, the motion of the device across the surface can be tracked.

Steps 402-406 will now be described in more detail.

Step 402: Acquire a Plurality of Initial Reference Images

In step 402, a plurality of initial reference images $R_{1I}$ to $R_{NI}$ are acquired and are set as current reference images $R_1$ to $R_N$.

Figure 5:
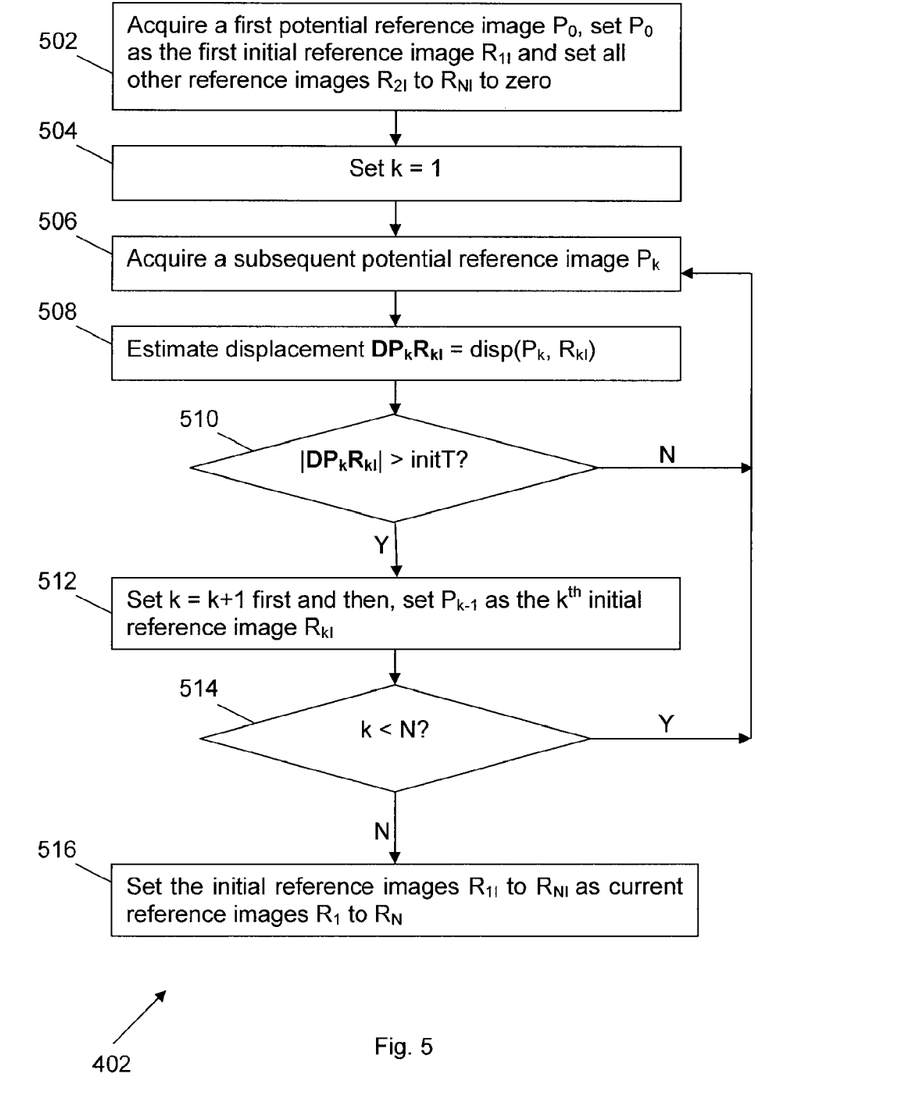
FIG. 5 shows a flow diagram of sub-steps in a step of the method of FIG. 4.

FIG. 5 shows the sub-steps of step 402. As shown in FIG. 5, step 402 comprises sub-steps 502-516.

In sub-step 502, a first potential reference image $P_0$ showing a first area of the surface is acquired. The image $P_0$ is set as the first initial reference image $R_{1I}$ whereas the remaining initial reference images $R_{2I}$ to $R_{NI}$ are set as zero. Next in sub-step 504, a counter k is initialized to a value of 1.

In sub-step 506, a subsequent potential reference image $P_k$ showing a subsequent area of the surface is acquired. This is followed by sub-step 508, in which the displacement $DP_k R_{kI}$ i.e. the displacement of the area shown in the most recently set initial reference image $R_{kI}$ from the subsequent area shown in the potential reference image $P_k$ is estimated. This displacement may be estimated in several ways which will be described in more detail later.

In sub-step 510, the magnitude of the displacement $DP_k R_{kI}$ (i.e. $|DP_k R_{kI}|$ which is equivalent to the distance between the subsequent area shown in the potential reference image $P_k$ and the area shown in the most recently set initial reference image $R_{kI}$) is compared against a threshold initT. In one example, initT is set to a value of F/8 (although other values of initT may be used as well). If the magnitude $|DP_k R_{kI}|$ is greater than the threshold initT, sub-step 512 is performed in which the potential reference image $P_k$ is set as the next initial reference image. More specifically, in sub-step 512, the counter k is first increased by 1 and then, the potential reference image (now $P_{k-1}$ since k has been increased by 1) is set as the $k^{th}$ initial reference image $R_{kI}$. On the other hand, if the magnitude $|DP_k R_{kI}|$ is less than or equal to the threshold initT, the counter k remains unchanged and sub-steps 506-510 are repeated.

After performing sub-step 512, sub-step 514 is executed to compare the value of the counter k against a value N. The value N represents the number of initial reference images to be acquired and in one example, is set as 4 (however, other values may be used as well). If the value of the counter k is less than the value N, sub-steps 506-514 are repeated. Otherwise, the initial reference images $R_{1I}$ to $R_{NI}$ are set as current reference images $R_1$ to $R_N$ in sub-step 516.

Step 404: Acquire Input Image

In each execution of step 404, an input image X is acquired. This input image X is acquired using the device and shows an input area of the surface where the device is.

Step 406: Determine the Displacement Between the Input Image and a Previously Acquired Image Using the Current Reference Images, and Perform Conditional Updating of the Current Reference Images In each execution of step 406, an input image X and a plurality of N current reference images $R_1$ to $R_N$ showing respective current reference areas of the surface are received as inputs.

The displacement between the input image X and a previously acquired image X' is then determined using the plurality of current reference images $R_1$ to $R_N$. This determines the motion of the device across the surface from an area shown in the previously acquired image X' to the input area shown in the input image X.

Furthermore, conditional updating of the current reference images $R_1$ to $R_N$ is performed to obtain updated reference images. Note that in this document, the term "current reference images" refers to the reference images $R_1$ to $R_N$ input to step 406 (i.e. the reference images $R_1$ to $R_N$ before the conditional updating). In particular, the "updated reference images" output from each execution of step 406 are input to a next execution of step 406 as "current reference images" of the next execution.

Figure 6:
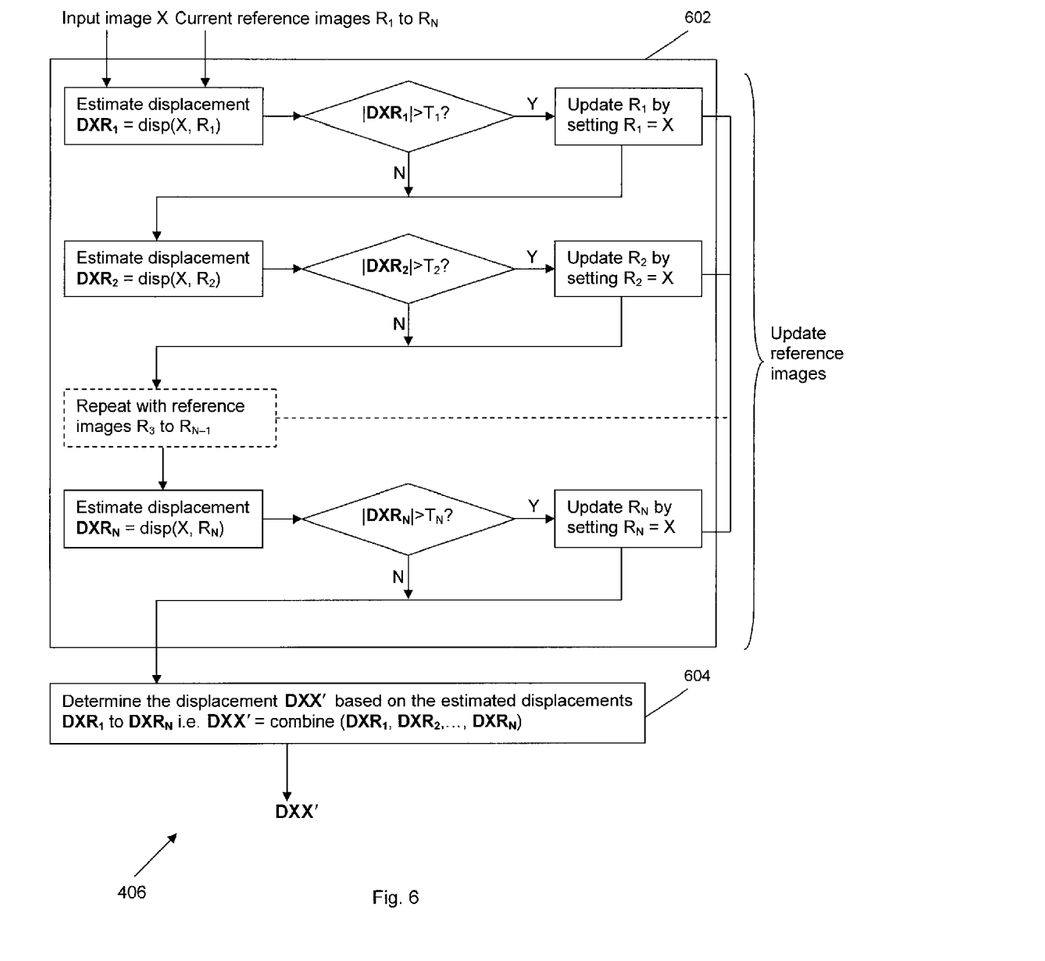
FIG. 6 shows a flow diagram of sub-steps in another step of the method of FIG. 4.

FIG. 6 illustrates the sub-steps of step 406. As shown in FIG. 6, step 406 comprises sub-steps 602 and 604.

In sub-step 602, the input image X is compared to the plurality of current reference images $R_1$ to $R_N$, to estimate the displacements $DXR_1, DXR_2, \ldots, DXR_N$ i.e. the displacements of each current reference area from the input area. These displacements may be estimated in several ways which will be explained in more detail later.

Conditional updating of the reference images is also performed in sub-step 602 to obtain updated reference images. In particular, after obtaining each estimated displacement $DXR_1, DXR_2, \ldots, DXR_N$, a decision on whether to update the corresponding current reference image is made. As shown in FIG. 4, the decision on whether to update each current reference image is made independently of the decisions on whether to update the remaining current reference images. Furthermore, the decisions are based on the estimated displacements $DXR_1, DXR_2, \ldots, DXR_N$. More specifically, the magnitude of each estimated displacement $|DXR_1|$, $|DXR_2|, \ldots, |DXR_N|$ is compared against a respective threshold $T_1, T_2, \ldots, T_N$. If the magnitude of an estimated displacement $|DXR_1|, |DXR_2|, \ldots, |DXR_N|$ is greater than its respective threshold $T_1, T_2, \ldots, T_N$, the corresponding current reference image $R_1, R_2, \ldots, R_N$ is updated to the input image X. In one example, the thresholds $T_1, T_2, \ldots, T_N$ are set to be equal at a value of F/6. However, the thresholds $T_1, T_2, \ldots, T_N$ need not be equal and may be set to other values.

Next in sub-step 604, the displacement DXX' i.e. the displacement of the area shown in the previously acquired image X' from the input area shown in the input image X is determined based on the displacements $DXR_1, DXR_2, \ldots, DXR_N$ estimated in sub-step 602.

If the previously acquired image X' is one of the current reference images, the displacement DXX' may simply be set as the estimated displacement between the input image X and the current reference image which the previously acquired image X' is. For example, if the previously acquired image X' is the current reference image $R_3$, then the displacement DXX' may simply be set as the displacement $DXR_3$ estimated in sub-step 602.

Alternatively, whether or not the previously acquired image X' is one of the current reference images $R_1$ to $R_N$, the displacement DXX' may be determined by considering the displacement of the input image X and the displacement of the previously acquired image X' from each of the current reference images $R_1$ to $R_N$. In particular, the displacement DXX' may be computed using Equation (2) below.

$$DXX' = \text{combine}(DXR_1, DXR_2 \ldots, DXR_N) \qquad (2)$$
$$= \frac{(DXR_1 - DX'R_1) + (DXR_2 - DX'R_2) + \ldots + (DXR_N - DX'R_N)}{N}$$

Equation (2) computes the displacement DXX' based on differences between the estimated displacements between the input image and each current reference image, and estimated displacements between the previously acquired image and each current reference image. Specifically, in Equation (2), $DX'R_1, DX'R_2, \ldots, DX'R_N$ respectively represent estimated displacements of the current reference areas shown in the current reference images $R_1, R_2, \ldots, R_N$ from the area shown in the previously acquired image X'. Each of these displacements $DX'R_1, DX'R_2, \ldots, DX'R_N$ may be estimated in a present execution of step 406 (e.g. before the reference images are updated), or may be a stored displacement from a previous execution of step 406 (if the corresponding reference image has not been updated in the previous execution).

Prior to determining the displacement DXX' between the input image X and the previously acquired image X', one or more of the displacements $DXR_1, DXR_2, \ldots, DXR_N$ estimated from sub-step 602 may be improved (i.e. improved estimates of these displacements may be derived). The improved displacements may be used for computing the displacement DXX' instead. For instance, they may be used in Equation (2) above or if the previously acquired image X' is one of the current reference images, the displacement DXX' may be set as the improved displacement between the input image X and the current reference image which the previously acquired image X' is. In addition, one or more of the improved displacements may be stored for subsequent use. For example, the stored improved displacements may be used to determine the displacements between the current input image X and subsequently acquired images. The displacements $DXR_1, DXR_2, \ldots, DXR_N$ may be improved using several ways which will be explained in more detail later Ways to Estimate the Displacement Between Two Images The displacement between two images may be estimated or determined in several ways.

For example, the displacement between two images may be estimated using the normalized cross correlation method which aims to maximize a cross-correlation between the images. In particular, the displacement of an area h shown in an image H from an area g shown in an image G may be obtained using the following Equations (3) and (4).

$$C(u, v) = \frac{\sum_{a,b} [G(a, b) - \overline{G}][H(a - u, b - v) - \overline{H}]}{\sqrt{\sum_{a,b} [G(a, b) - \overline{G}]^2 [H(a - u, b - v) - \overline{H}]^2}} \qquad (3)$$

In Equation (3), G(a, b) denotes the intensity value of the pixel at coordinates (a, b) of the image G. H(a−u, b−v) denotes the intensity value of the pixel at coordinates (a−u, b−v) of the image H. $\overline{G}$ denotes the mean of the intensity values of the pixels in the image G whereas $\overline{H}$ denotes the mean of the intensity values of the pixels in the image H. The values of u and v may be varied in a range comprising both positive and negative values.

The displacement between the two images G and H (in particular, DGH) is determined from the coordinates $u_{max}$ and $v_{max}$ at which C(u, v) is maximized. More specifically, as shown in Equation (4) below, the horizontal component $DGH_h$ of the displacement DGH is set as $u_{max}$ whereas the vertical component $DGH_v$ of the displacement DGH is set as $v_{max}$. The magnitude of the displacement DGH is the argument of these horizontal and vertical components $DGH_h$, $DGH_v$ whereas the direction of the displacement DGH is dependent on the signs of the coordinates $u_{max}$ and $v_{max}$.

$$(DGH_h, DGH_v) = \text{argmax}_{u,v}[C(u, v)] = (u_{max}, v_{max}) |DGH| = \quad (4)$$

$$|disp(G, H)| = \sqrt{DGH_h^2 + DGH_v^2} = \sqrt{u_{max}^2 + v_{max}^2}$$

The displacement between two images may also be estimated using other ways known to those skilled in the art. For example, the optical flow estimation method developed by Lucas and Kanade or the phase correlation method proposed by Castro and Morandi may be used.

Ways to Derive Improved Estimates of the Displacements $DXR_1, DXR_2, \ldots, DXR_N$ As mentioned above, in sub-step 604 of step 406, improved estimates of one or more of the displacements $DXR_1$, $DXR_2, \ldots, DXR_N$ estimated in sub-step 602 may be derived. This may be performed in several ways, a few examples of which are described below.

Deriving the Improved Estimates Using a Least Squares Method

Improved estimates of the displacements $DXR_1$, $DXR_2, \ldots, DXR_N$ may be derived using a least squares method. This method works by minimizing a cost function formed using the displacements $DXR_1, DXR_2, \ldots, DXR_N$ estimated from sub-step 602.

For example, with N=3, the cost function may be in the form as shown in Equation (5) below.

$$\text{Cost function} = |dXR_1 - DXR_1|^2 + |dXR_2 - DXR_2|^2 + |dXR_3 - DXR_3|^2 + \lambda[|dXR_1 - dXR_2 - DR_2R_1|^2 + |dXR_1 - dXR_3 - DR_3R_1|^2 + |dXR_2 - dXR_3 - DR_3R_2|^2] \quad (5)$$

In Equation (5), $dXR_1$, $dXR_2$, $dXR_3$ respectively denote improved estimates of the displacements $DXR_1$, $DXR_2$, $DXR_3$. These improved estimates are the unknowns to be determined.

Furthermore, in Equation (5), $DR_2R_1$ denotes the displacement between current reference images $R_1$ and $R_2$, $DR_3R_1$ denotes the displacement between current reference images $R_1$ and $R_3$, and $DR_3R_2$ denotes the displacement between current reference images $R_2$ and $R_3$. These displacements $DR_2R_1$, $DR_3R_1$ and $DR_3R_2$ are determined using the current reference images $R_1$, $R_2$ and $R_3$. In addition, these displacements $DR_2R_1$, $DR_3R_1$ and $DR_3R_2$ may be determined in step 402 or sub-step 602 (either sub-step 602 in a previous execution of step 406 after the reference images are updated or sub-step 602 in a present execution of step 406).

As shown in Equation (5), the cost function is constrained by a parameter λ which represents the consistency between the improved estimates $dXR_1$, $dXR_2$, $dXR_3$ and the displacements $DXR_1$, $DXR_2$, $DXR_3$ estimated in sub-step 602. In one example, λ is set as 0.5 whereas in another example, λ is set as 0.125. The improved estimates $dXR_1$, $dXR_2$, $dXR_3$ are determined such that the cost function in Equation (5) is minimized. This minimization of the cost function serves to fit the improved estimates $dXR_1$, $dXR_2$, $dXR_3$ to the displacements $DXR_1$, $DXR_2$, $DXR_3$ estimated in sub-step 602. In particular, the minimization of the cost function serves to minimize the differences between the displacements $DR_2R_1$, $DR_3R_1$ and $DR_3R_2$ determined using the current reference images $R_1$, $R_2$, $R_3$ as mentioned above, and corresponding displacements determined using the improved estimates (i.e. $dXR_1 - dXR_2$ which corresponds to $DR_2R_1$, $dXR_1 - dXR_3$ which corresponds to $DR_3R_1$ and $dXR_2 - dXR_3$ which corresponds to $DR_3R_2$).

Minimization of the cost function in Equation (5) may be achieved by differentiating the cost function and setting the resulting derivatives to zero. In particular, differentiation of the cost function produces three equations comprising the three improved estimates $dXR_1$, $dXR_2$ and $dXR_3$ which are the unknowns to be derived. By setting these equations to zero, the following Equations (6)-(8) are obtained.

$$(1+2\lambda)dXR_1 - \lambda(dXR_2 + dXR_3) = DXR_1 + \lambda(DR_2R_1 + DR_3R_1) \quad (6)$$

$$(1+2\lambda)dXR_2 - \lambda(dXR_1 + dXR_3) = DXR_2 + \lambda(DR_3R_2 + DR_2R_1) \quad (7)$$

$$(1+2\lambda)dXR_3 - \lambda(dXR_1 + dXR_2) = DXR_3 + \lambda(DR_3R_1 + DR_3R_2) \quad (8)$$

The improved estimates $dXR_1$, $dXR_2$, $dXR_3$ may then be derived by solving the above Equations (6)-(8). In particular, Equations (6)-(8) may be formulated as a linear system as shown below in Equation (9).

$$Ad = \begin{pmatrix} 1+2\lambda & -\lambda & -\lambda \\ -\lambda & 1+2\lambda & -\lambda \\ -\lambda & -\lambda & 1+2\lambda \end{pmatrix} \begin{pmatrix} dXR_1 \\ dXR_2 \\ dXR_3 \end{pmatrix} = \quad (9)$$

$$D = \begin{pmatrix} DXR_1 \\ DXR_2 \\ DXR_3 \end{pmatrix} + \lambda \begin{pmatrix} DR_2R_1 + DR_3R_1 \\ DR_3R_2 + DR_2R_1 \\ DR_3R_1 + DR_3R_2 \end{pmatrix}$$

Since the matrix A on the left of Equation (9) is invertible, the matrix d comprising the improved estimates $dXR_1$, $dXR_2$ and $dXR_3$ may be obtained using Equation (10) wherein inv (A) represents the inverse of the matrix A.

$$d = \text{inv}(A) * D. \quad (10)$$

One or more of the displacements $DXR_1$, $DXR_2$, $DXR_3$ are then improved by setting these displacements as their respective improved estimates $dXR_1$, $dXR_2$, $dXR_3$ derived according to Equation (10).

As mentioned above, the improved displacements may be used in Equation (2) to obtain a more accurate determination of the displacement DXX' between the input image X and the previously acquired image X'. For example, if improved estimates of the displacements $DX'R_1, DX'R_2, \ldots, DX'R_N$ for the previously acquired image X' have also been derived using equations similar to Equations (5)-(10) above, then the displacement DXX' between the input image X and the previously acquired image X' may be obtained using Equation (11) below.

$$DXX' = \text{combine}(DXR_1, DXR_2, DXR_3) \quad (11)$$

$$= \frac{\text{sum}(d) - \text{sum}(d')}{N} = \frac{\text{sum}(d) - \text{sum}(d')}{3}$$

In Equation (11), $d' = (dX'R_1 \; dX'_2 \; dX'R_3)^T$ whereby $dX'R_1$, $dX'R_2$, $dX'R_3$ are respectively the improved estimates of the displacements $DX'R_1$, $DX'R_2$, $DX'R_3$. Furthermore, sum(d) and sum(d') respectively denote vectors having two components, each of which is the sum of the corresponding elements in the matrix d and d'.

Deriving the Improved Estimates by Using a Maximum Joint Correlation Method

Improved estimates of the displacements $DXR_1$, $DXR_2, \ldots, DXR_N$ may alternatively be derived by maximizing a joint correlation between the input image X and shifted versions of the current reference images $R_1, R_2, \ldots, R_N$.

For example, with N=3, the improved estimates may be determined using the joint correlation function in Equation (12) below.

Joint correlation function=

$$\int\int_{a,b}\left[\begin{array}{l}R_1\binom{a+dXR_{1h},b+}{dXR_{1v}}R_2(a+dXR_{2h},b+dXR_{2v})\\R_3(a+dXR_{3h},b+dXR_{3v})X(a,b)\end{array}\right]dadb \quad (12)$$

The function in Equation (12) computes the joint correlation between the input image X and images showing areas of the surface displaced from the current reference areas (shown in the current reference images $R_1, R_2, \ldots, R_N$) by amounts equal to the improved estimates.

More specifically, in Equation (12), $dXR_{1h}$, $dXR_{2h}$, $dXR_{3h}$ are respectively the horizontal components of the improved estimates $dXR_1$, $dXR_2$, $dXR_3$ (which are the unknowns to be determined), whereas $dXR_{1v}$, $dXR_{2v}$, $dXR_{3v}$ are respectively the vertical components of the improved estimates $dXR_1$, $dXR_2$, $dXR_3$. Furthermore, $R_1$ ($a+dXR_{1h}$, $b+dXR_{1v}$) denotes the intensity value of the pixel at the coordinates ($a+dXR_{1h}$, $b+dXR_{1v}$) of the current reference image $R_1$, $R_2(a+dXR_{2h},b+dXR_{2v})$ denotes the intensity value of the pixel at the coordinates ($a+dXR_{2h}$,$b+dXR_{2v}$) of the current reference image $R_2$ and $R_3(a+dXR_{3h},b+dXR_{3v})$ denotes the intensity value of the pixel at the coordinates ($a+dXR_{3h}$,$b+dXR_{3v}$) of the current reference image $R_3$.

The horizontal and vertical components of the improved estimates $dXR_1$, $dXR_2$, $dXR_3$ are determined such that the joint correlation function in Equation (12) is maximized. This may be done using a search routine, such as a three-step search routine. At a starting point of the search routine, the horizontal and vertical components of the improved estimates $dXR_1$, $dXR_2$, $dXR_3$ may be respectively set as the horizontal and vertical components of the displacements $DXR_1$, $DXR_2, \ldots, DXR_N$ estimated from sub-step 602. One or more of the displacements $DXR_1$, $DXR_2$, $DXR_3$ are then improved by setting these displacements as their respective improved estimates $dXR_1$, $dXR_2$, $dXR_3$.

Deriving the Improved Estimates Using a Weighted Average Method

Improved estimates of the displacements $DXR_1$, $DXR_2, \ldots, DXR_N$ estimated in sub-step 602 may alternatively be derived by using a weighted average method.

In particular, with N=3, the improved estimates $dXR_1$, $dXR_2$, $dXR_3$ of the displacements $DXR_1$, $DXR_2, \ldots, DXR_N$ may be calculated using the following equations.

$$dXR_1=\alpha_1(DXR_2+DR_2R_1)+\beta_1(DXR_3+DR_3R_1)+(1-\alpha_1-\beta_1)DXR_1$$

$$dXR_2=\alpha_2(DXR_1-DR_2R_1)+\beta_2(DXR_3+DR_3R_2)+(1-\alpha_2-\beta_2)DXR_2$$

$$dXR_3=\alpha_3(DXR_1-DR_3R_1)+\alpha_3(DXR_2-DR_3R_2)+(1-\alpha_3-\beta_3)DXR_3 \quad (13)$$

Each equation in (13) above corresponds to a current reference image and comprises approximations of the displacement between the input image and the respective current reference image. The approximations are obtained in different ways using the displacements $DXR_1, DXR_2, \ldots, DXR_N$ estimated in sub-step 602 and the displacements $DR_2R_1$, $DR_3R_1$, $DR_3R_2$ estimated using the current reference images $R_1$, $R_2$ and $R_3$. For example, to derive the improved estimate $dXR_1$ of the displacement $DXR_1$, approximations of the displacement between X and $R_1$ obtained in the three different ways $DXR_2+DR_2R_1$, $DXR_3+DR_3R_1$ and $DXR_1$ are used. Each equation in (13) performs a weighted average of the approximations it comprises. More specifically, $\alpha_1$, $\alpha_2$, $\alpha_3$ and $\beta_1$, $\beta_2$, $\beta_3$ are weights which may be varied. In one example, these weights are set as $\alpha_1=\alpha_2=\alpha_3=\beta_1=\beta_2=\beta_3=\frac{1}{3}$.

After obtaining the improved estimates $dXR_1$, $dXR_2$, $dXR_3$ using the equations in (13), one or more of the displacements $DXR_1$, $DXR_2$, $DXR_3$ are then improved by setting these displacements as their respective improved estimates $dXR_1$, $dXR_2$, $dXR_3$, in other words, as the respective weighted averages.

Note that although the above examples described with reference to Equations (5)-(13) use N=3, the examples may be easily extended to other values of N. The examples may also be easily extended to cases whereby improved estimates $dXR_1$, $dXR_2, \ldots, dXR_N$ are derived for only some (and not all) of the displacements $DXR_1$, $DXR_2, \ldots, DXR_N$ estimated in sub-step 602.

Variations to Method 400

Although only a single embodiment of the invention has been described in detail above, it is to be understood that many variations are possible within the scope of the invention, as defined by the claims. A few examples of such variations are given below.

Although the displacement DXX' is determined in method 400, the displacement DX'X (i.e. the displacement in the opposite direction) may instead be determined. The same applies for all other displacements used or determined in method 400. However, note that the steps and equations in method 400 using or determining these displacements have to be modified accordingly. These modifications can be easily done by those skilled in the art. Furthermore, although the images acquired in method 400 are of the same size, differently sized images may instead be acquired. In this case, additional steps may be required to either extract relevant areas in the larger images or resize the images such that the steps as described above for method 400 may still be performed. Also, although the images acquired in method 400 are 2D images, method 400 may easily be extended to acquire and operate on three-dimensional (3D) images. Equations (3), (4) and (12) are replaced by 3D versions, with appropriate changes such as either summations or integrals over three variables a, b and c instead of two variables a and b.

In addition, the initial reference images may be acquired in a manner different from that shown in FIG. 5. The initial reference images also need not be acquired by the device. In any case, it is preferable if one or both of the following criteria are satisfied: (i) for each initial reference image, the distance between the area shown in the initial reference image and the area shown in at least one other initial reference image is greater than a predetermined minimum distance and (ii) the signal-to-noise ratio (SNR) of each initial reference image is greater than a predetermined minimum SNR. Moreover, the step of acquiring the initial reference images need not be part of method 400. In other words, step 402 in method 400 is optional and may be omitted. This would be applicable, for example, in an embodiment in which the device is provided with a standard surface to be moved over (e.g. a surface having landmarks such as a grid), and the reference images of the standard surface are pre-selected and pre-loaded into the device.

Furthermore, although in FIG. 4, the operations in sub-step 602 are shown to be performed sequentially, these operations may instead be performed in parallel. In particular, the displacement between the input image and each current reference image (e.g. $DXR_1$) may be estimated simultaneously (i.e. in parallel) with the displacements between the input image and the other current reference images (e.g. $DXR_2, \ldots, DXR_N$). Similarly, the comparisons of the magnitudes of the estimated displacements i.e. $|DXR_1|$ to $|DXR_N|$ to their respective thresholds $T_1$ to $T_N$ may also be performed in parallel. The same applies for the conditional updating of the current reference images. Performing the operations in sub-step 602 in parallel instead of sequentially allow these operations to be performed at the same rate as the acquisition of the input images. In other words, these operations can be performed in real-time.

Also, the conditional updating of the current reference images in sub-step 602 is optional and may be omitted (although, this is not preferable). Moreover, each current reference image to be updated need not be updated to the input image. Each current reference image (showing a current reference area) may instead be updated to an image showing an area nearer the input area than the current reference area is to the input area. The updated reference images also need not be identical. In addition, the decision on whether to update each current reference image need not be independent of the decisions on whether to update the other current reference images. For example, in deciding whether to update a particular current reference image, it may be useful to take into consideration whether some of the other current reference images are already updated and what images these current reference images are updated to.

Commercial Applications

Figure 7:
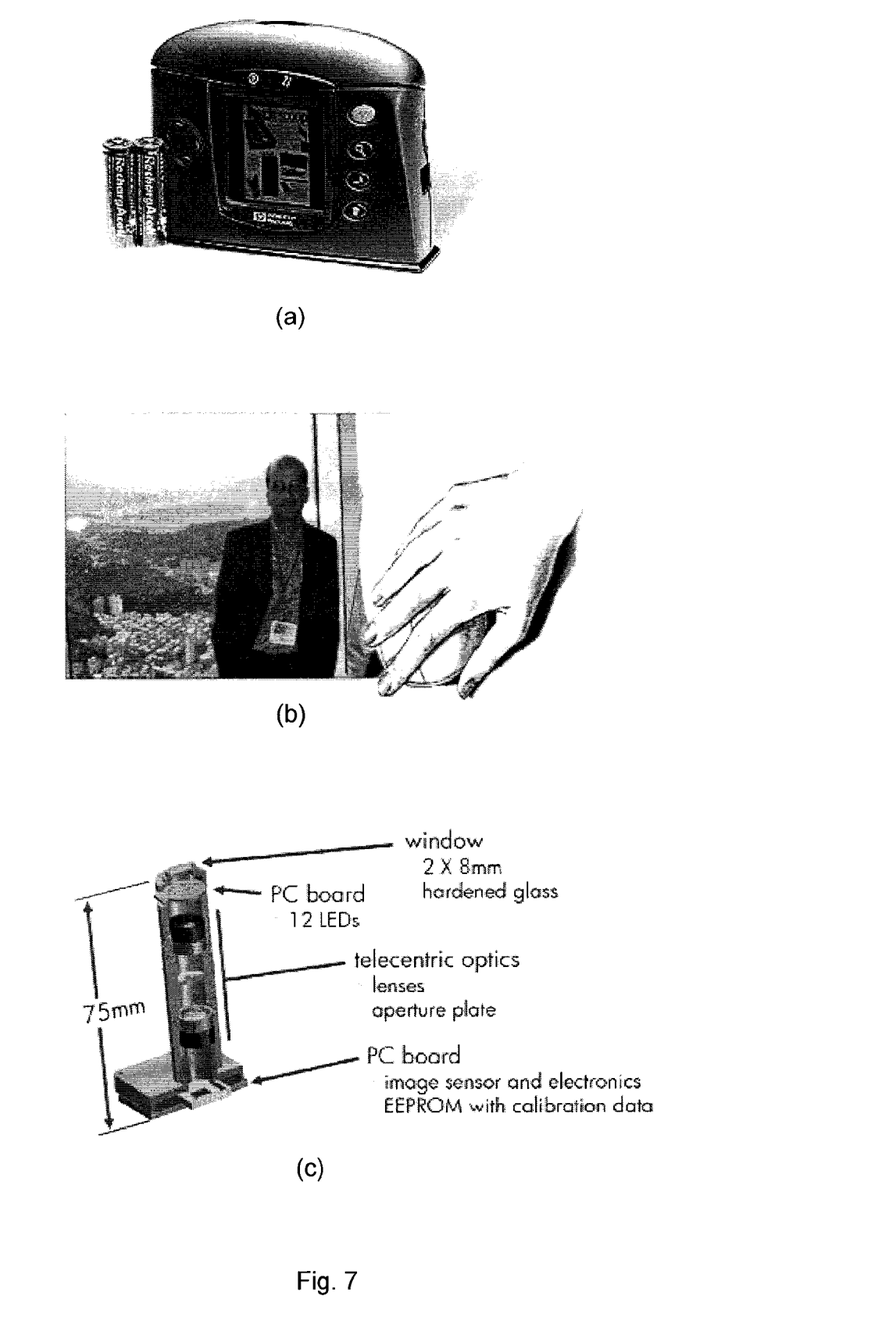

FIGS. 7(a)-(c) show some commercial applications of the embodiments of the present invention.

In particular, the embodiments of the present invention may be used in a handheld scanner. FIG. 7(a) shows a prior art handheld scanner, more specifically, a HP Capshare handheld scanner. Similar to the optical mouse, this prior art handheld scanner employs an optical navigation system comprising an image acquisition device. The optical navigation system is configured to track the motion of the handheld scanner based on images acquired by the image acquisition device. However, the accuracy of the motion tracking in this prior art handheld scanner is not high and therefore, high-quality results cannot be achieved. Furthermore, it is difficult to scan photos and graphics with high accuracy using this prior art handheld scanner. Such prior art handheld scanners can be made more accurate by incorporating embodiments of the present invention into these scanners.

FIG. 7(b) shows a conceptual drawing of a handheld printer. Similar to many other types of printers, the handheld printer comprises a printhead which is configured to dispense ink. However, rather than feeding the print media (e.g. paper) through the printhead, the handheld printer is moved over the print media for printing purposes. In particular, data to be printed is first downloaded into the handheld printer. As the handheld printer is moved by hand across a print media, ink is dispensed by the printhead onto the print media to print the data. Specifically, ink is dispensed onto each area of the print media as the handheld printer moves over the area. The motion of the handheld printer over the print media is freeform similar to that of a handheld scanner or an optical mouse. To ensure that data is printed at the correct locations on the print media, the handheld printer requires an accurate optical navigation system for estimating the motion of the handheld scanner. Such an accurate optical navigation system may be achieved by using embodiments of the present invention.

FIG. 7(c) shows a prior art printhead slippage detector, in particular, a Hewlett-Packard (HP) Omas sensor. This printhead slippage detector is often used in HP's large-format printers. Printhead slippage detectors also employ optical navigation systems comprising image acquisition devices whereby the optical navigation systems track the motion of the printhead slippage detectors based on images acquired by the image acquisition devices. Like several other prior art printhead slippage detectors, the performance of the HP Omas sensor does not meet the standards required for reliable consumer printing. However, by using the embodiments of the present invention in the optical navigation systems of printhead slippage detectors, low-cost and highly accurate printhead slippage detectors may be developed.

Advantages

The following describes some advantages of the embodiments of the present invention.

Embodiments of the present invention are advantageous as unlike prior art algorithms which use a single reference image, the embodiments of the present invention employ a plurality of reference images for tracking the motion of a device across a surface.

In particular, in the embodiments of the present invention, each reference image is used to obtain an independent estimate of the displacement between an input image and a previously acquired image. By combining these independent estimates, more accurate results can be obtained and hence, cumulative errors can be reduced. This in turn improves the accuracy of tracking the motion of the device.

The use of multiple reference images in the embodiments of the present invention also allows the detection of abnormal conditions such as "bald" patches on a surface (i.e. patches where there are no features) and highly repetitive features. It also achieves a more reliable detection of the motion of the device. Furthermore, conventionally, when a wireless optical mouse is stationary for a predetermined period of time, say 10 seconds, it enters a low-power "sleep" mode to save battery life: the wireless communication of the mouse is turned off and the motion of the mouse is sampled less frequently. When the user moves the mouse, it wakes up and starts functioning normally. The transition between sleep and wake-up is problematic in conventional systems because random noise or vibrations on the table can cause false wake-ups, wasting battery life. Hence wake-up is usually determined when the motion with respect to a reference image is sufficiently large, but the measurement of whether this criterion is met is not reliable if the reference has a low signal-to-noise ration. Hence, the present invention may be useful in ensuring that while the device is in sleep mode it is activated (or woken up) only when it is moved, because the use of multiple references increases the reliability, because it diversifies the measurement over independent images.

Furthermore, in some embodiments of the present invention e.g. method 400, the plurality of reference images are regularly updated by updating one or more of the reference images each time if certain conditions are met. The use of multiple reference images and the ability to update only a subset of the reference images each time helps to ensure that the plurality of reference images used for each input image comprise images of sufficiently high quality (e.g. with high SNR) and having an adequate amount of overlap with the input image.

Although more reference images are used in the embodiments of the present invention, the additional amount of processing required is not excessive. In particular, the additional processing required is mainly for computing the displacements between the images. However, the displacement between two images is symmetric i.e. the magnitude of the displacement in one direction is equal to the magnitude of the displacement in the opposite direction. Therefore, after computing the displacement between a pair of images in one direction, it is not necessary to compute this displacement in the opposite direction since this can be easily derived by negating the computed displacement. Furthermore, the computed displacements may be stored and thus, each displacement required in the embodiments of the present invention needs only to be computed once.

The invention claimed is:

1. A method for tracking the motion of a device across a surface, the method comprising repeatedly performing the following steps (a)-(d):
   (a) acquiring, using an image sensor of the device, an input image showing an input area, the input area being a portion of the surface which is in the field of view of the image sensor;
   (b) comparing the input image to a plurality of current reference images showing respective current reference areas of the surface to estimate the displacement between the input area and each current reference area, wherein the plurality of current reference images comprise previously acquired images;
   (c) determining whether to update each individual current reference image based on the displacements estimated in step (b), and if said determination is positive for an individual current reference image, updating the individual current reference image to form an updated reference image; and
   (d) determining, based on the displacements, the motion of the device across the surface from an area shown in a previously acquired image to the input area;
   wherein prior to step (d) in each repetition of steps (a)-(d), the method further comprises improving one or more of the displacements estimated in step (b) by:
   (i) determining the displacement between each current reference area and each of the other current reference areas using the current reference images;
   (ii) determining improved estimates of the displacements estimated in step (b), by minimizing a function of differences between the displacements determined in step (i) and corresponding displacements determined with the improved estimates; and
   (iii) improving the one or more of the displacements by setting these displacements as their respective improved estimates.

2. A method according to claim 1, wherein the determination on whether to update each individual current reference image is made independently of the decisions on whether to update the other individual current reference images in the plurality of current reference images.

3. A method according to claim 1, wherein for each individual current reference image, said determination on whether to update the individual current reference image is positive if the estimated displacement between the input area and the current reference area shown in the individual current reference image has a magnitude greater than a threshold.

4. A method according to claim 1, wherein for at least one individual current reference image, if said determination is positive, the individual current reference image is updated to an image showing an area nearer to the input area than the current reference area shown in the individual current reference image is to the input area.

5. A method according to claim 1, wherein for at least one individual current reference image, if said decision is positive, the corresponding individual current reference image is updated to the input image.

6. A method according to claim 1, wherein the function is constrained by a parameter representing a consistency between the improved estimates and the displacements estimated in step (b).

7. A method according to claim 1, wherein the displacement between the input area and each current reference area is estimated by maximizing a cross-correlation between the input image and the corresponding individual current reference image showing the corresponding individual current reference area.

8. A method according to claim 1, wherein the displacement between the input area and each current reference area is estimated in parallel with the displacements between the input area and each of the remaining current reference areas.

9. A method according to claim 1, wherein the previously acquired image in step (d) is one of the plurality of current reference images; and step (d) further comprises determining the motion of the device as the estimated displacement between the input area and the current reference area shown in the previously acquired image.

10. A method according to claim 1, wherein in step (d), the motion of the device is determined further based on estimated displacements between the area shown in the previously acquired image and each current reference area.

11. A method according to claim 10, wherein in step (d), the motion of the device is determined based on differences between (17i) the estimated displacements between the input area and each current reference area, and (17ii) the estimated displacements between the area shown in the previously acquired image and each current reference area.

12. A method for tracking the motion of a device across a surface, the method comprising repeatedly performing the following steps (a)-(d):
   (a) acquiring, using an image sensor of the device, an input image showing an input area, the input area being a portion of the surface which is in the field of view of the image sensor;
   (b) comparing the input image to a plurality of current reference images showing respective current reference areas of the surface to estimate the displacement between the input area and each current reference area, wherein the plurality of current reference images comprise previously acquired images;
   (c) determining whether to update each individual current reference image based on the displacements estimated in step (b), and if said determination is positive for an individual current reference image, updating the individual current reference image to form an updated reference image; and
   (d) determining, based on the displacements, the motion of the device across the surface from an area shown in a previously acquired image to the input area;
   wherein prior to step (d) in each repetition of steps (a)-(d), the method further comprises improving one or more of the displacements estimated in step (b) by:
   determining improved estimates of the displacements estimated in step (b), such that a joint correlation between the input image and images showing areas of the surface displaced from the current reference areas by the improved estimates is maximized; and
   improving the one or more of the displacements by setting these displacements as their respective improved estimates.

13. A method for tracking the motion of a device across a surface, the method comprising repeatedly performing the following steps (a)-(d):
   (a) acquiring, using an image sensor of the device, an input image showing an input area, the input area being a portion of the surface which is in the field of view of the image sensor;
   (b) comparing the input image to a plurality of current reference images showing respective current reference areas of the surface to estimate the displacement between the input area and each current reference area, wherein the plurality of current reference images comprise previously acquired images;

(c) determining whether to update each individual current reference image based on the displacements estimated in step (b), and if said determination is positive for an individual current reference image, updating the individual current reference image to form an updated reference image; and (d) determining, based on the displacements, the motion of the device across the surface from an area shown in a previously acquired image to the input area;

wherein prior to step (d) in each repetition of steps (a)-(d), the method further comprises improving one or more of the displacements estimated in step (b) by: performing the following steps (10i)-(10iii) for each current reference area whose estimated displacement between the input area and itself is to be improved:

(10i) estimating the displacement between the current reference area and each of the other current reference areas using the current reference images;

(10ii) calculating a weighted average of approximations of the displacement between the input area and the current reference area, wherein the approximations are obtained in different ways using the displacements estimated in step (b) and the displacements estimated in step (10i); and (10iii) improving the displacement between the input area and the current reference area by setting this displacement as the weighted average.

14. A method for tracking the motion of a device across a surface, the method comprising repeatedly performing the following steps (a)-(d):

(a) acquiring, using an image sensor of the device, an input image showing an input area, the input area being a portion of the surface which is in the field of view of the image sensor;

(b) comparing the input image to a plurality of current reference images showing respective current reference areas of the surface to estimate the displacement between the input area and each current reference area, wherein the plurality of current reference images comprise previously acquired images;

(c) determining whether to update each individual current reference image based on the displacements estimated in step (b), and if said determination is positive for an individual current reference image, updating the individual current reference image to form an updated reference image; and (d) determining, based on the displacements, the motion of the device across the surface from an area shown in a previously acquired image to the input area;

wherein prior to repeatedly performing steps (a)-(d), the method further comprises:

acquiring a plurality of initial reference images, wherein for each initial reference image, the distance between the area shown in the initial reference image and the area shown in at least one other initial reference image is greater than a predetermined minimum distance; and setting the plurality of initial reference images as the current reference images.

15. A method according to claim 14, wherein acquiring the plurality of initial reference images comprises:

acquiring a first image showing a first area of the surface and setting the first image as the first initial reference image; and repeatedly performing the following steps:

acquiring a subsequent image showing a subsequent area of the surface;

deciding, based on a distance between the subsequent area and the area shown in the most recently set initial reference image, whether to set the subsequent image as a next initial reference image; and if so, setting the subsequent image as the next initial reference image.

16. A computer system arranged to track the motion of a device across a surface, the computer system being arranged to (a) acquire, using an image sensor of the device, an input image showing an input area, the input area being a portion of the surface which is in the field of view of the image sensor;

and the computer system having a processor arranged to:

(b) compare the input image to a plurality of current reference images showing respective current reference areas of the surface to estimate the displacement between the input area and each current reference area, wherein the plurality of current reference images comprise previously acquired images;

(c) determine whether to update each individual current reference image based on the displacements estimated in step (b), and if said determination is positive for an individual current reference image, updating the individual current reference image to form an updated reference image; and (d) determine, based on the displacements, the motion of the device across the surface from an area shown in a previously acquired image to the input area;

wherein the processor is further arranged to:

prior to step (d) in each repetition of steps (a)-(d), improve one or more of the displacements estimated in step (b) by:

(i) determining the displacement between each current reference area and each of the other current reference areas using the current reference images;

(ii) determining improved estimates of the displacements estimated in step (b), by minimizing a function of differences between the displacements determined in step (i) and corresponding displacements determined with the improved estimates; and (iii) improving the one or more of the displacements by setting these displacements as their respective improved estimates.

17. A computer system arranged to track the motion of a device across a surface, the computer system being arranged to (a) acquire, using an image sensor of the device, an input image showing an input area, the input area being a portion of the surface which is in the field of view of the image sensor;

and the computer system having a processor arranged to:

(b) compare the input image to a plurality of current reference images showing respective current reference areas of the surface to estimate the displacement between the input area and each current reference area, wherein the plurality of current reference images comprise previously acquired images;

(c) determine whether to update each individual current reference image based on the displacements estimated in step (b), and if said determination is positive for each individual current reference image, updating the individual current reference image to form an updated reference image; and (d) determine, based on the displacements, the motion of the device across the surface from an area shown in a previously acquired image to the input area;

wherein the processor is further arranged to:

prior to step (d) in each repetition of steps (a)-(d), improve one or more of the displacements estimated in step (b) by:

determining improved estimates of the displacements estimated in step (b), such that a joint correlation between the input image and images showing areas of the surface displaced from the current reference areas by the improved estimates is maximized; and improving the one or more of the displacements by setting these displacements as their respective improved estimates.

18. A computer system arranged to track the motion of a device across a surface, the computer system being arranged to (a) acquire, using an image sensor of the device, an input image showing an input area, the input area being a portion of the surface which is in the field of view of the image sensor;

and the computer system having a processor arranged to:

(b) compare the input image to a plurality of current reference images showing respective current reference areas of the surface to estimate the displacement between the input area and each current reference area, wherein the plurality of current reference images comprise previously acquired images;

(c) determine whether to update each individual current reference image based on the displacements estimated in step (b), and if said determination is positive for an individual current reference image, updating the individual current reference image to form an updated reference image; and (d) determine, based on the displacements, the motion of the device across the surface from an area shown in a previously acquired image to the input area;

wherein the processor is further arranged to:

prior to step (d) in each repetition of steps (a)-(d), improve one or more of the displacements estimated in step (b) by:

performing the following steps (i)-(iii) for each current reference area whose estimated displacement between the input area and itself is to be improved:

(i) estimating the displacement between the current reference area and each of the other current reference areas using the current reference images;

(ii) calculating a weighted average of approximations of the displacement between the input area and the current reference area, wherein the approximations are obtained in different ways using the displacements estimated in step (b) and the displacements estimated in step (i); and (iii) improving the displacement between the input area and the current reference area by setting this displacement as the weighted average.

19. A computer system arranged to track the motion of a device across a surface;

the computer system being arranged to (a) acquire, using an image sensor of the device, an input image showing an input area, the input area being a portion of the surface which is in the field of view of the image sensor;

and the computer system having a processor arranged to:

(b) compare the input image to a plurality of current reference images showing respective current reference areas of the surface to estimate the displacement between the input area and each current reference area, wherein the plurality of current reference images comprise previously acquired images;

(c) determine whether to update each individual current reference image based on the displacements estimated in step (b), and if said determination is positive for an individual current reference image, updating the individual current reference image to form an updated reference image; and (d) determine, based on the displacements, the motion of the device across the surface from an area shown in a previously acquired image to the input area;

wherein the processor is further arranged to, prior to repeatedly performing steps (a)-(d):

acquire a plurality of initial reference images, wherein for each initial reference image, the distance between the area shown in the initial reference image and the area shown in at least one other initial reference image is greater than a predetermined minimum distance; and set the plurality of initial reference images as the current reference images.

\* \* \* \* \*